(12) United States Patent
Ottmann et al.

(10) Patent No.: US 9,797,518 B2
(45) Date of Patent: Oct. 24, 2017

(54) PRESSURE MEDIUM CONTAINER FOR A HYDRAULIC MOTOR VEHICLE BRAKE SYSTEM

(71) Applicant: Continental Teves AG & Co. oHG, Frankfurt (DE)

(72) Inventors: Swen Ottmann, Frankfurt (DE); Hans-Jürgen Neumann, Rüsselsheim (DE); Werner Krebs, Hambach (DE); Stephan Schlicht, Nauheim (DE); Christoph Schiel, Bad Nauheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/758,878

(22) PCT Filed: Dec. 19, 2013

(86) PCT No.: PCT/EP2013/077333
§ 371 (c)(1),
(2) Date: Jul. 1, 2015

(87) PCT Pub. No.: WO2014/106588
PCT Pub. Date: Jul. 10, 2014

(65) Prior Publication Data
US 2015/0330523 A1    Nov. 19, 2015

(30) Foreign Application Priority Data

Jan. 7, 2013  (DE) .................. 10 2013 000 041
Mar. 28, 2013 (DE) .................. 10 2013 005 375

(51) Int. Cl.
*B65D 51/16*   (2006.01)
*F16K 15/02*   (2006.01)
(Continued)

(52) U.S. Cl.
CPC .............. *F16K 15/02* (2013.01); *B60T 11/22* (2013.01); *B60T 11/26* (2013.01); *B60T 13/142* (2013.01);
(Continued)

(58) Field of Classification Search
CPC . B65D 51/1644; B65D 51/165; B60T 8/4872; B60T 11/26
See application file for complete search history.

(56) References Cited

U.S. PATENT DOCUMENTS 3,527,376 A * 9/1970 Young, Jr. ............ B65D 51/165
                                                        220/203.17
4,785,961 A * 11/1988 Kasugai ............ B60K 15/0406
                                                        220/203.25
(Continued)

FOREIGN PATENT DOCUMENTS

DE    2429704       1/1976
DE    4209534       10/1992
(Continued)

OTHER PUBLICATIONS

International Search Report for International Application No. PCT/EP2013/077333 dated Aug. 28, 2015.
(Continued)

*Primary Examiner* — Jeffrey Allen
(74) *Attorney, Agent, or Firm* — RatnerPrestia

(57) ABSTRACT

A pressure medium container for a hydraulic motor vehicle brake system. A pressure medium container is provided including a container casing the interior of which can be filled with a pressure medium via a filler pipe and is closed off by a closure cap fixed to the filler pipe. A sealing element made from an elastomeric material is provided between the filler pipe and a bottom of the closure cap. The sealing element has a valve which rests on a support pedestal
(Continued)

arranged on the closure cap is closed in a non-actuated initial state and reaches an opened actuated state under the control of differential pressure, whereby a pressure is equalized between an interior of the pressure medium container and an ambient atmosphere. Direction-dependently, the valve has different valve opening resistances.

19 Claims, 6 Drawing Sheets

(51) Int. Cl.
  *B60T 11/22* (2006.01)
  *B60T 11/26* (2006.01)
  *B60T 17/06* (2006.01)
  *B60T 17/22* (2006.01)
  *B60T 13/14* (2006.01)

(52) U.S. Cl.
  CPC ............ *B60T 17/06* (2013.01); *B60T 17/222* (2013.01); *Y10T 137/86485* (2015.04)

(56) References Cited

U.S. PATENT DOCUMENTS

| | | | | |
|---|---|---|---|---|
| 5,025,628 | A * | 6/1991 | Layman | .................. B60T 11/26 60/585 |
| 5,269,431 | A * | 12/1993 | Sakata | ............... B60K 15/0406 220/203.17 |
| 5,435,454 | A * | 7/1995 | Ishii | ....................... B65D 51/16 220/374 |
| 8,757,417 | B2 | 6/2014 | Neumann | |
| 2003/0062371 | A1 | 4/2003 | Hirao | |
| 2009/0291628 | A1* | 11/2009 | Neumann | ............. B60T 8/4872 454/237 |

FOREIGN PATENT DOCUMENTS

| | | |
|---|---|---|
| DE | 102005054751 | 5/2007 |
| DE | 102006046479 | 1/2008 |
| DE | 102010010412 | 6/2011 |
| DE | 102011104394 | 1/2013 |
| GB | 2254317 | 10/1992 |

OTHER PUBLICATIONS

Written Opinion of the International Searching Authority for International Application No. PCT/EP2013/077333 dated Aug. 28, 2015.
German Search Report for German Application No. 10 2013 005 375.7 dated Oct. 17, 2013, including partial translation.

* cited by examiner

PRESSURE MEDIUM CONTAINER FOR A HYDRAULIC MOTOR VEHICLE BRAKE SYSTEM

CROSS REFERENCE TO RELATED APPLICATIONS

This application is the U.S. National Phase Application of PCT International Application No. PCT/EP2013/077333, filed Dec. 19, 2013, which claims priority to German Patent Application No. 10 2013 000 041.6, filed Jan. 7, 2013 and 10 2013 005 375.7, filed Mar. 28, 2013, the contents of such applications being incorporated by reference herein.

FIELD OF THE INVENTION

The invention concerns a pressure medium container for a hydraulic motor vehicle brake system.

BACKGROUND OF THE INVENTION

Pressure medium containers for hydraulic motor vehicle brake systems are known. Usually such pressure medium containers are mounted in the engine bay directly on the brake master cylinder or at least connected thereto hydraulically via lines. In many vehicle variants, the installation conditions present in the engine bay mean that pressure medium containers are used which are formed more linear than cuboid, because for example front windscreens with a shallow slope angle and at the same time a more compact construction of a brake actuating system mean that pressure medium containers must be arranged below the header tank.

In order to be able to receive the filling device for vacuum or pressure filling at the neck, such an arrangement means that the filler pipe is usually mounted at the front in the driving direction or on a front end of the pressure medium container. Because of such a decentralized arrangement of the filler pipe however, during driving operation or in transport, frequently during a braking process or when parking on a steep downhill gradient, the filler pipe is regularly flooded with the pressure medium.

The closing caps of generic containers usually have devices for pressure equalization with the surrounding atmosphere. To prevent the pressure medium from escaping through such a pressure medium equalization device during flooding of the filler pipe, complex systems are provided which are intended to guarantee a venting function and prevent an escape of the fluid, but at the same time these increase the complexity and production cost of the closing cap.

SUMMARY OF THE INVENTION

An aspect of the invention aims to eliminate said disadvantages and offer an improved pressure medium container which is simple and economic to produce and install, wherein a venting function is still reliably guaranteed and at the same time an escape of fluid from the pressure medium container through the closing cap is effectively prevented.

An aspect of the invention comprises a valve which is arranged resting on a bearing pedestal and having different valve opening resistances depending on direction. In this way the air can still flow in both directions so that a pressure equalization can take place securely, but the pressure medium is largely retained in order not to escape into the environment.

In an advantageous refinement of the invention, the valve opening resistance may be set higher in the direction of the surrounding atmosphere than in the opposite direction, for example in the direction of a pressure medium chamber inside the pressure medium container. Thus emergence of the pressure medium from the pressure medium container through the valve is effectively prevented, without hindering the intake of pressure medium from the pressure medium container to the brake master cylinder. In a further refinement of the invention, the valve may, particularly simply and effectively, comprise at least one slot in the sealing element of the closing cap so that it can be produced particularly simply and economically and be adaptable to different requirement profiles.

In an advantageous embodiment, the bearing pedestal for the sealing element may be configured as a tubular profile which extends from a base of the closing cap in the direction of the sealing element and has at least one air passage between an inside and an outside of the tubular profile. Thus a reliable valve function and pressure equalization function can be ensured particularly simply.

Particularly advantageously, the closing cap may have support means which supports the valve in at least one valve opening direction and hence increases the valve opening resistance in the supported valve opening direction. Thus the desired influencing of the valve opening resistance and its adaptation can be achieved reliably in a particularly efficient manner and without increasing the installation complexity. In a further advantageous refinement, the support means may be arranged on the base of the closing cap and/or be integrated in, preferably molded onto, the closing cap. In this way a functional, highly integrated closing cap is provided which can be produced technologically simply, for example in the injection molding process. No additional components or mounting operations are required.

Preferably, the support means may be arranged inside the bearing pedestal, wherein the valve function is influenced particularly simply and the response behavior of the valve can be predefined particularly precisely.

One particularly effective embodiment of the support means provides that this may be formed as a tubular profile which extends from the base of the closing cap in the direction of the sealing element and has at least one air passage between an inside and an outside of the tubular profile. In a further refinement of the invention, on a pressure difference equal to zero between the tubular profile of the support means and the sealing element, a distance may be provided in the direction of the sealing element. In this way, particularly simply, the response behavior of the valve can be defined constructionally, preferably in steps or progressively.

In a further advantageous embodiment, the support means may be designed cuboid, plate-like, pin-like, conical or otherwise, and be arranged at the side of the slot of the valve on the base of the closing cap. In this way, virtually any arbitrary influence can be exerted on the valve behavior in a particularly simple manner.

Advantageously, the air equalization and hence the pressure equalization between the interior of the pressure medium container and the surrounding atmosphere can be created particularly simply and economically via a radially running air channel formed in the base of the closing cap and via a recess of a thread connected thereto on the collar of the closing cap.

Particularly effectively, a degree of increase in the valve opening resistance may be predefined by a support distance from the support means. In this way, by change of a single parameter, the pressure medium container can be adapted to different requirement profiles effectively, precisely and with very little proliferation.

Particularly advantageously and simply, a pressure difference, which is necessary for opening the valve in at least one valve opening direction, may be predefined constructionally by a ratio of a length of the slot to a thickness of the sealing element in the region of the slot, and hence adapted to widely varying applications. Here a ratio in a range between 4 and 6 is preferred, because this allows a particularly good valve functionality for a generic container.

BRIEF DESCRIPTION OF THE DRAWINGS

Further details, features, advantages and possible applications of the invention arise from the subclaims together with the description with reference to the drawings. Corresponding components and constructional elements as far as possible carry the same reference numerals. The drawings show:

DETAILED DESCRIPTION OF THE PREFERRED EMBODIMENTS

FIG. 1

Figure 1:
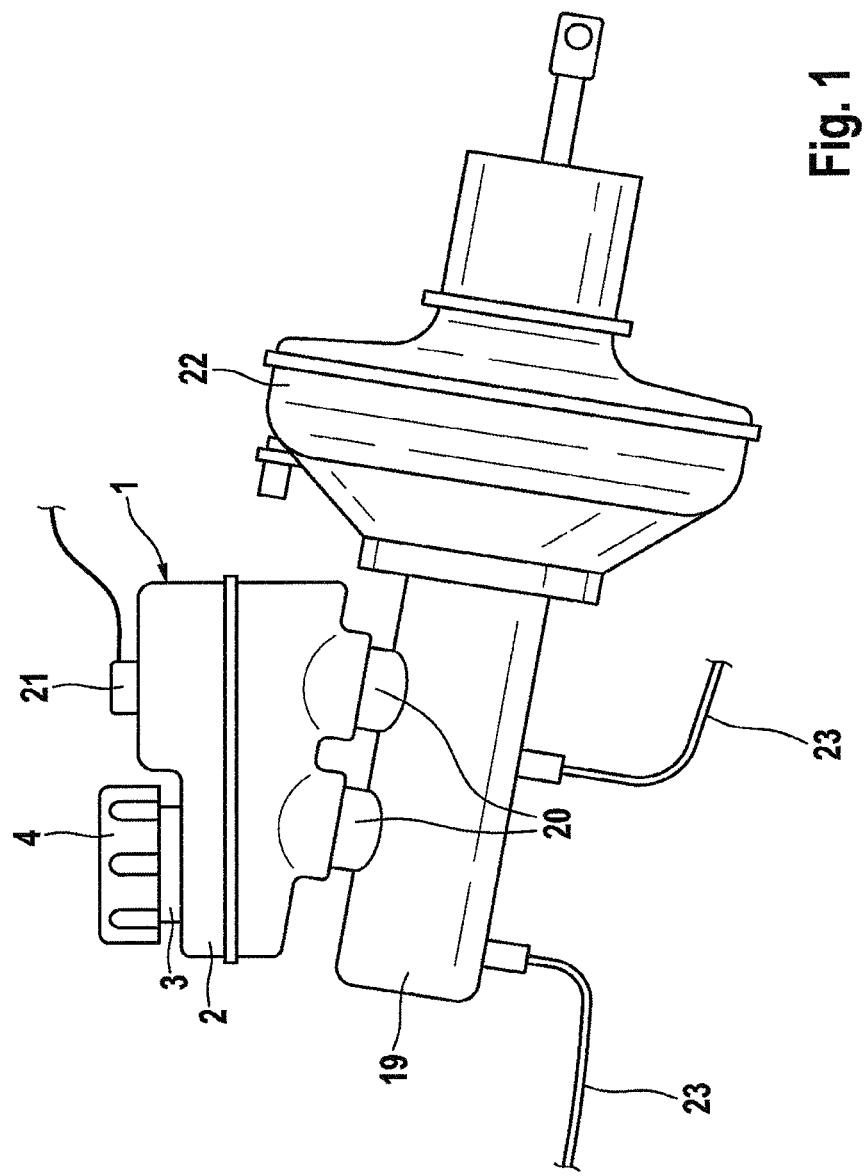
FIG. 1 a pressure medium container mounted on a tandem brake master cylinder of a hydraulic motor vehicle brake system.

FIG. 1 shows a pressure medium container 1 according to the invention with a container housing 2 which is mounted, by means of two push-fit connections 20, on a tandem brake master cylinder 19 of a hydraulic motor vehicle brake system, and at the same time is hydraulically connected to the pressure chambers (not shown) in the brake master cylinder 19. However other connections of different design (not shown), for example remote connections by means of flexible or rigid lines, or an indirect connection to a brake master cylinder 19 with the interposition of a further reservoir (not shown), are possible within the invention. The pressure chambers (not shown) of the brake master cylinder 19 are connected hydraulically via brake lines 23 to wheel brakes or brake regulation assemblies. The container housing has a filler pipe 3 which is suitable for filling the pressure medium container and can be closed by a cap 4, preferably by means of a threaded connection. Further connections, such as for example a bayonet connection or a simple push-fit connection, are also conceivable without leaving the invention.

Furthermore, the pressure medium container 1 may have fill level sensors 21 and further auxiliary devices (not shown). Pneumatic brake servo 22 is assigned to the brake master cylinder 19, but the invention may also be implemented with an electrohydraulic, combined or further force-amplifying devices (not shown).

FIG. 2

Figure 2:
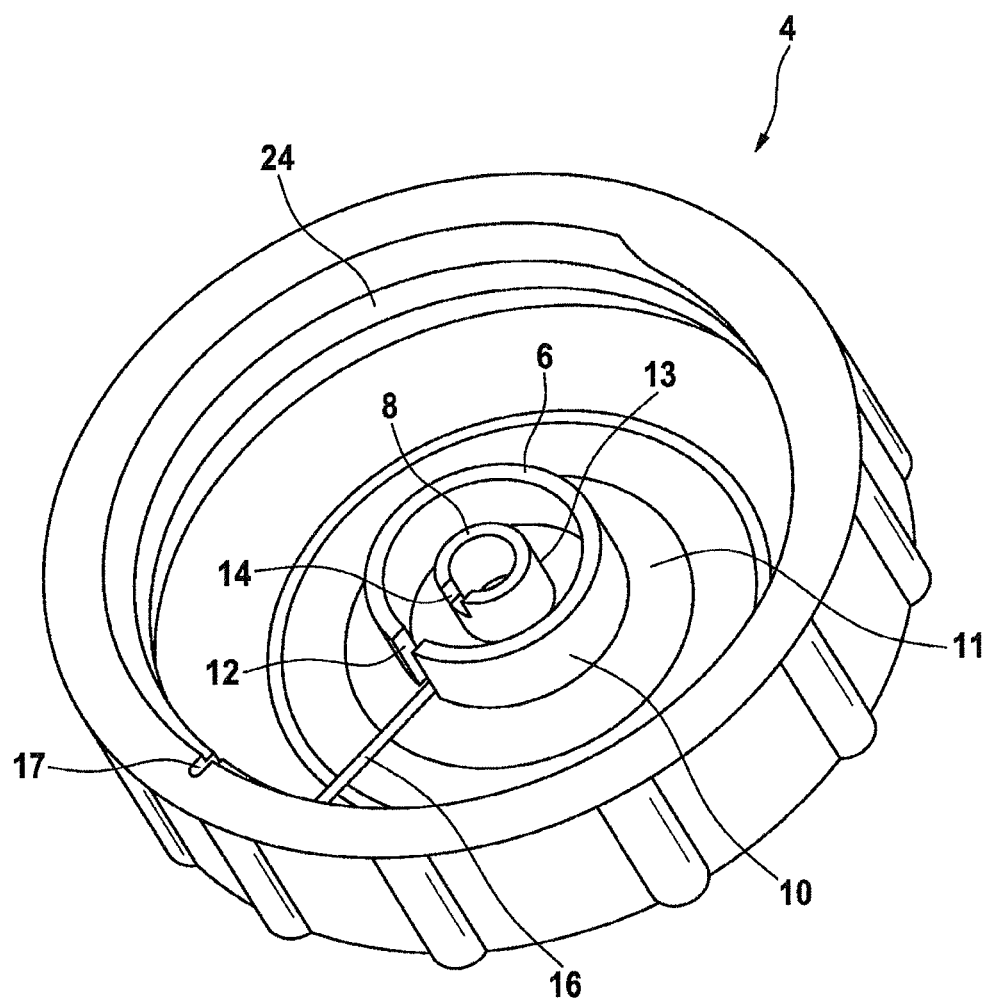
FIG. 2 a first embodiment of the closing cap of a pressure medium container according to the invention without sealing element.

FIG. 2 shows a first embodiment of a closing cap 4 of a pressure medium container 1 according to the invention. The closing cap 4 is formed substantially pot-like with a base 11 and a peripheral collar on which a thread 24 is arranged. The thread 24 serves for fixing of the closing cap 4 to the filler pipe 3 and corresponds with a thread (not shown) on the filler pipe 3. For the sake of better understanding of the structure of the closing cap 4, no sealing element is shown here. In order to allow a pressure equalization with the surrounding atmosphere after mounting of the closing cap 4 on the filler pipe 3, the closing cap 4 has an air channel 16 which is let into the base 11 of the closing cap 4 and is connected to a recess 17 in the thread 24. Preferably, both the air channel 16 and the recess 17 may be formed as a groove, but further embodiments are also possible within the same invention, for example as a tubular channel let into the closing cap or a simple opening through the closing cap.

To support the sealing element 5, not shown here, a bearing pedestal 6 is provided, the function of which will be discussed in more detail below. The bearing pedestal 6 is here formed as a tubular profile 10 which extends from the base 11 of the closing cap 4 in the direction of the sealing element 5 (not shown here), wherein between the radial inside and outside of the tubular profile, an air passage 12 is provided in order to connect the interior of the bearing pedestal 6 pneumatically to the air channel 16, and thus allow a pressure equalization when the sealing element 5 rests on the bearing pedestal.

The closing cap 4 furthermore has a support means 8 for supporting a valve 7 integrated in the sealing element 5. In the embodiment shown here, the support means 8 is configured as a tubular profile 13 which extends from the base 11 of the closing cap 4 in the direction of the sealing element 5 (not shown here) and is arranged inside the bearing pedestal 6. Between the inside and outside of the tubular profile 13, an air passage 14 is provided in order to connect the interior of the tubular profile 13 pneumatically to the interior of the bearing pedestal 6, and thus allow a pressure equalization when the sealing element 5 rests on the tubular profile 13. Such a construction allows the closing cap 4 to be produced in a technologically particularly efficient manner, since most construction elements are designed substantially rotationally symmetrical and undercuts are largely avoided.

As an alternative to the embodiment of the support means 8 shown, further embodiments are permissible within the invention which will be described in more detail below.

FIG. 3

Figure 3:
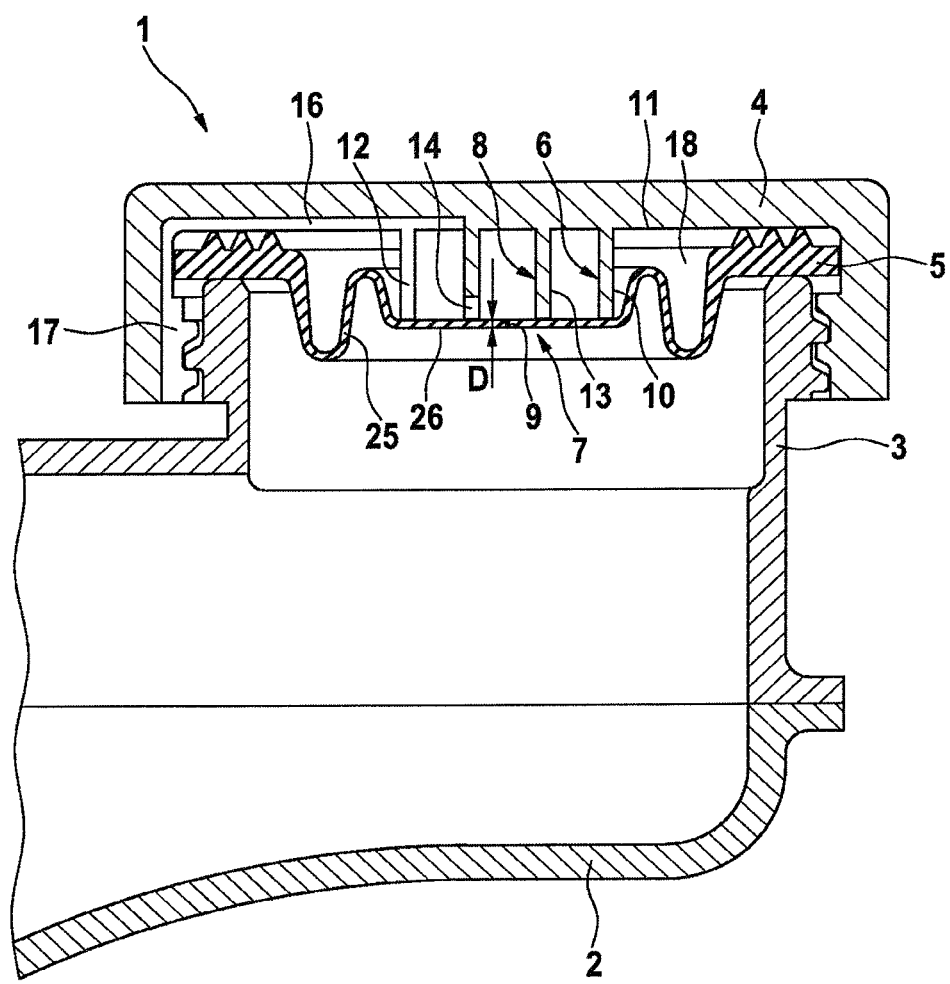
FIG. 3 a cross-section view of a filler pipe of the embodiment of the pressure medium container according to the invention with a closing cap according to FIG. 2.

FIG. 3 shows a section through the container housing 2 in the region of the filler pipe 3. An embodiment of the closing cap 4, already described in FIG. 2, is mounted on the filler pipe 3. A sealing element 5 made of an elastic and preferably elastomer material is clamped between the base 11 and the filler pipe 3. In its center, the sealing element 5 has a largely planar, flat valve face 26 with a preferably constant thickness D. In the middle of the valve face 26, a valve 7 is arranged which in the embodiment shown here is formed as a slot 9.

An air chamber 18 is delimited between the base 11 and the sealing element 5 and is connected to the surrounding atmosphere via the air channel 16 and the recess 17. The sealing element lies with the radially outer region of the valve face 26 on the bearing pedestal 6. As already described above, the bearing pedestal 6 is formed by a tubular profile 10 which comprises an air passage 12. The tubular profile 10 extends from the base 11 of the closing cap 4 to the sealing element 5 in the region of its flat valve face 26, and lies against this so that the interior of the bearing pedestal 4 with the sealing element 5 delimits a type of air chamber, which is pneumatically connected via the air passage 12 to the air channel 16 and hence to the surrounding atmosphere so that on both sides of the valve disc 26, a pressure difference can be built up between the pressure of the surrounding atmosphere and a pressure in the interior of the pressure medium container 1. At a specifically defined pressure difference, the valve face begins to deform and the valve 7 opens. The valve 7 can open in two valve opening directions. A valve opening direction opposite to the base 11 is active when a pressure inside the pressure medium container 1 is lower than the pressure of the surrounding atmosphere (container vacuum). In this case, due to the pressure difference, air enters the interior of the pressure medium container 1 from the interior of the bearing pedestal 6 or the surrounding atmosphere. Conversely, a valve opening direction towards the base 11 is active when a pressure inside the pressure medium container 1 is higher than a pressure of the surrounding atmosphere (container positive pressure). In this case, due to the pressure difference, air escapes from the interior of the pressure medium container 1 into the interior of the bearing pedestal 6 or into the surrounding atmosphere. Because the interior of the bearing pedestal 6, as described above, is permanently connected to the surrounding atmosphere, in this way the pressure equalization between the surrounding atmosphere and the interior of the pressure medium container 1 can take place at any time.

The support means 8 is arranged inside the tubular profile 10 of the bearing pedestal 6. In the exemplary embodiment shown, the support means is configured tubular, similarly to the bearing pedestal 6, with a tubular profile 13 which extends from the base 11 of the closing cap 4 in the direction of the sealing element 5, so that it further supports the valve face 26 in one direction, preventing a deformation of the valve face 26 in the direction of the base 11 and thus increasing the valve opening resistance of the valve 7 on the emergence of air from the pressure medium container 1.

Furthermore the sealing element 5 may have a roll membrane 25 in order for example to prevent undesirable transverse stresses in the valve face 26, and thus always reliably ensure stable and calculable valve functions of the valve 7 at all pressure differences.

FIG. 4

Figure 4:
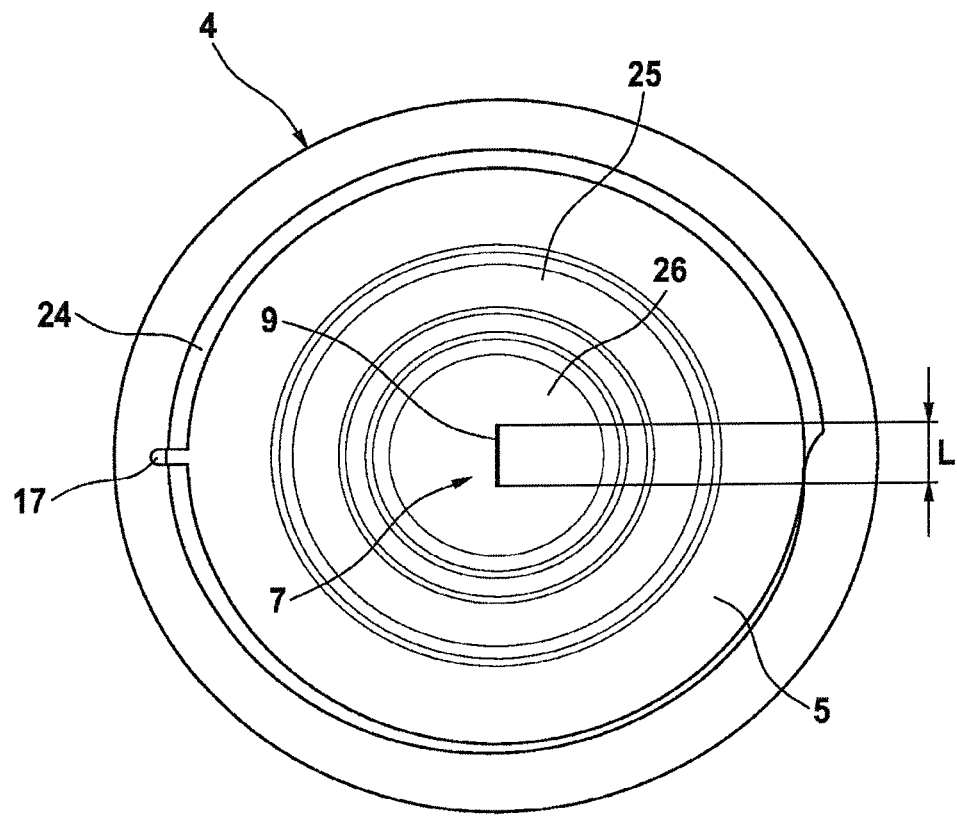
FIG. 4 an embodiment according to the invention of the closing cap with a fitted sealing element.

FIG. 4 shows an embodiment according to the invention of the closing cap 4 with inset sealing element 5 in a view from below in the direction towards the base of the sealing cap 4. This view illustrates one possible fundamental embodiment of the sealing element 5. As can be seen, in its radial center the sealing element 5 comprises the round valve face 26 which is surrounded by the roll membrane 25 and has a valve 7 in the center. In the exemplary embodiment shown, the valve 7 is formed as a straight slot 9 with a slot length L. The ratio of the thickness D, already described, of the sealing element 5 in the region of the valve face 26 to the slot length L is decisive for the response behavior of the valve 7, namely the minimum pressure difference required for the valve to open. Preferably, the ratio L/D has a value between 4 and 6, wherein further value ranges are also functionally possible.

As well as the embodiment of the valve 7 shown with a single straight slot 9, within the invention further embodiments are possible, for example a cross slot, a wavy or curved slot, or further slot forms.

Furthermore, the picture shows the recess 17 in the region of the thread 24 on the collar of the closing cap 4, through which pressure equalization to the surrounding atmosphere takes place.

FIG. 5

Figure 5:
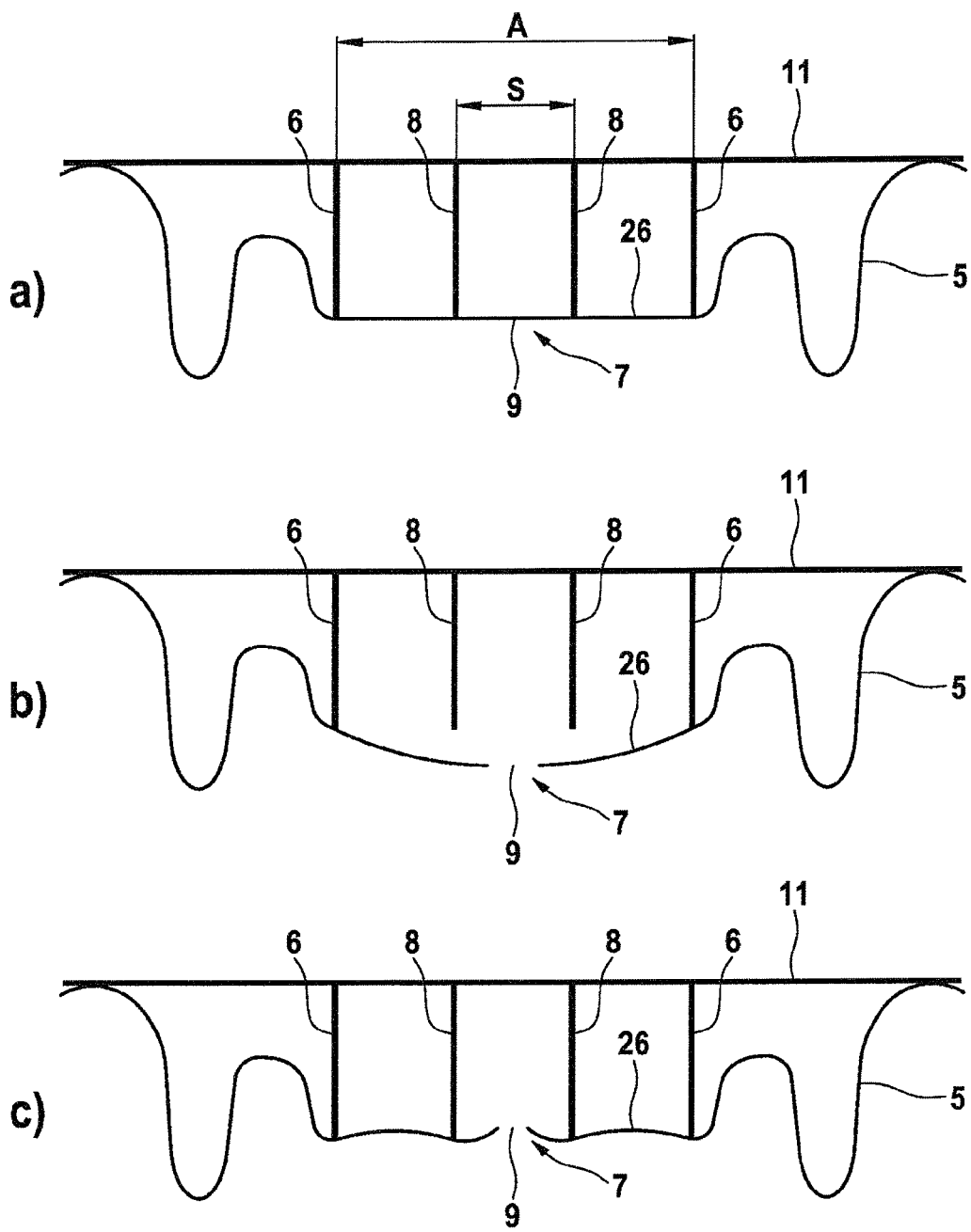
FIG. 5 a simplified sketch to depict the valve function according to the invention with the closed valve (a) and opened valve for air inlet (b) and air outlet (c).

FIG. 5 depicts diagrammatically a greatly simplified working principle of the valve 7, not to scale, as already described above. Reference should be made to FIGS. 1 to 4 for the elements not shown in this figure but already mentioned.

View a) shows the valve 7 with a balanced pressure ratio, or a pressure difference equal to zero. This constitutes for example a generally desired ideal state or a normal state with the vehicle parked, or a brake system momentarily not in operation. The sealing element 5 lies with its valve face 26 both on the bearing pedestal 6 and on the support means 8, the valve face 26 is flat and not curved, the valve 7 is closed and the slot 9 is closed.

View b) shows the valve under a negative pressure difference or container vacuum.

Such a situation results for example from suction processes when the pressure medium flows out of the pressure medium container 1 into the brake master cylinder 19 or is extracted by the brake master cylinder 19. A container vacuum causes a highly undesirable increase in suction resistance which could negatively affect the brake functions. Therefore in the case of a container vacuum, a particularly spontaneous response of the valve 7 at a pressure difference as low as possible is desirable, so that a container vacuum can be equalized as quickly as possible.

As clearly evident from view b), under a container vacuum the entire valve surface 26 curves away from the base 11 so that the valve 7 opens rapidly even under a relatively low pressure difference, and the slot 9 can be expanded relatively widely.

View c) shows the valve under a positive pressure difference or container positive pressure. Such a situation may arise for example when the pressure medium in the pressure medium container 1 sloshes in the direction of the filler pipe 3 because of vehicle movements, or when the vehicle is tilted greatly forward relative to the horizontal, or when the temperature of the pressure medium increases relatively quickly.

Under a container positive pressure, there is an increased risk that the usually flammable pressure medium will escape from the pressure medium container 1. It is essential to avoid or at least hinder this.

Due to the supporting effect of the support means 8, a curvature of the entire valve face 26 is prevented so that the valve face 26 only deforms within the support distance S for the valve 7. Because the support distance S is substantially smaller than the bearing distance A, the region of the valve face 26 exposed to the pressure difference for the valve effect is substantially smaller than in the case of a container vacuum. A greater pressure difference is required to open the valve, the response behavior of the valve 7 is delayed, and the valve opening resistance is increased.

By defining the support distance S, a degree of a relative increase of the valve opening resistance under container positive pressure can be defined constructionally. It is also possible to change the height of the support means 8 relative to the height of the bearing pedestal 6, so that a gap remains between the support means 8 and the valve face 26 under a balanced pressure ratio (see FIG. 5a). Thus e.g. a stepped response behavior of the valve can be achieved—a fine response under a low pressure difference initially, followed by a strong progressive rise in the valve opening resistance under higher pressure differences.

FIG. 6

Figure 6:
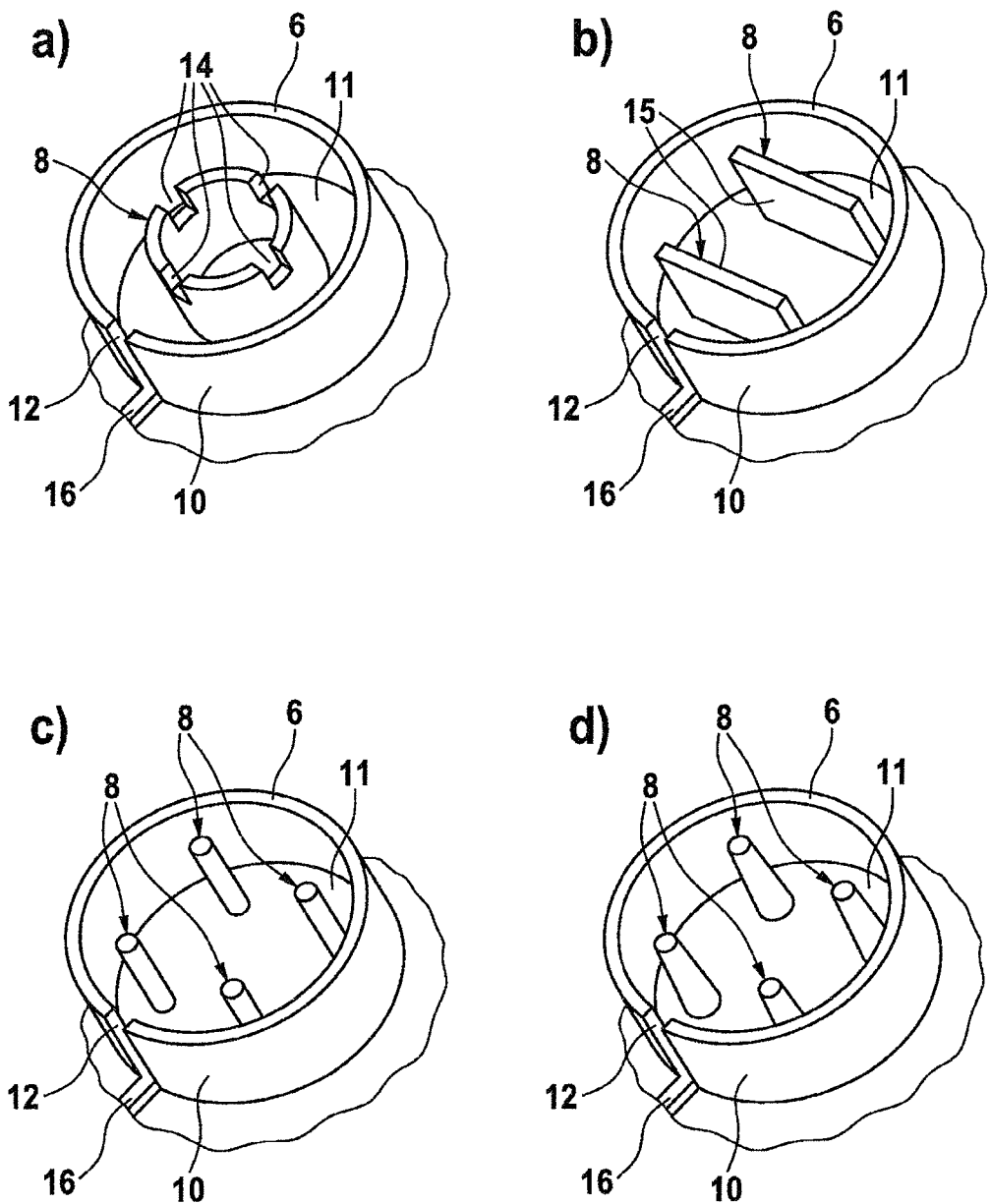
FIG. 6 partial views of some embodiments (a-d) according to the invention of a support means on a closing cap of a pressure medium container.

FIG. 6 shows as an example four further possible embodiments according to the invention of a support means 8. The embodiment of the support means 8 in view a, like the embodiment already described in FIG. 2, is configured as a tubular profile but has four air passages 14 distributed around the periphery instead of just one. Evidently another number of air passages is possible within the invention.

The embodiment of the support means 8 in view b is formed from two cubes 15 or plates which are arranged parallel to each other and each laterally offset to the slot 9 on the base 11. A further embodiment with just one plate would also be conceivable.

The support means 8 in view c are designed as pin-like protrusions or bumps. The embodiment shown has four pin-like support means 8 which are each arranged laterally offset to the slot 9 on the base 11. Evidently other numbers of pin-like support means 8 are possible within the invention, wherein a plurality of such support means 8 may be arranged in a circle next to each other on the base 11 of the closing cap 4.

In contrast to the embodiment in FIG. 6c, the support means 8 in view d has a conical form.

Preferably, all embodiments described of support means and bearing pedestals are integrated in the closing cap or designed integrally therewith.

LIST OF REFERENCE SIGNS

1 Pressure medium container
2 Container housing
3 Filler pipe
4 Closing cap
5 Sealing element
6 Bearing pedestal
7 Valve
8 Support means
9 Slot
10 Tubular profile
11 Base of closing cap
12 Air passage
13 Tubular profile
14 Air passage
15 Cube
16 Air channel
17 Recess
18 Air chamber
19 Brake master cylinder
20 Push-fit connection
21 Fill level sensors
22 Brake servo
23 Brake line
24 Thread
25 Roller membrane
26 Valve face
D Thickness of sealing element
L Length of slot
A Bearing distance
S Support distance

The invention claimed is:

1. A pressure medium container for a hydraulic motor vehicle brake system comprising:
a container housing with a filler pipe and an interior, and
a closing cap which is attached to the filler pipe, the closing cap including:
   a) a base,
   b) a substantially circular elastic sealing element arranged between the filler pipe and the base, the substantially circular elastic sealing element including a roll membrane having a first portion downwardly concave towards the container, and a second portion upwardly convex towards the cap,
   c) a valve, integrated into the sealing element and arranged substantially in the middle of the sealing element in respect to the radial direction of said sealing element,
wherein the valve is closed in an unactuated starting state and, based on pressure difference, enters an opened actuated state in which a pressure equalization takes place between a surrounding atmosphere and the interior of the pressure medium container,
   d) a bearing pedestal protruding from the base in an axial direction towards the sealing element, said bearing pedestal supports the sealing element in the axial direction towards the base on at least two positions arranged radially between the valve and both the first and second portions of the roll membrane, and
   e) a support structure protruding from the base in an axial direction towards the sealing element, said support structure spaced from the bearing pedestal in the radial direction towards the valve position and supports the sealing element in the axial direction towards the base on at least two positions arranged radially between the valve and both the first and second portions of the roll membrane.

2. The pressure medium container as claimed in claim 1, wherein the valve opening resistance of the valve is set greater in the direction of the surrounding atmosphere than in the direction of the interior of the container.

3. The pressure medium container as claimed in claim 1, wherein the valve has at least one slot in the sealing element.

4. The pressure medium container as claimed in claim 1, wherein the bearing pedestal is configured as a tubular profile which extends from the base in the direction of the sealing element and has at least one air passage between an inside and an outside of the tubular profile.

5. The pressure medium container as claimed in claim 1, wherein the support structure supports the valve in at least one valve opening direction and thus increases the valve opening resistance in the supported valve opening direction.

6. The pressure medium container as claimed in claim 5, wherein the support structure is arranged on the base of the closing cap.

7. The pressure medium container as claimed in claim 6, wherein the support structure is provided as an integral part of the closing cap.

8. The pressure medium container as claimed in claim 5, wherein the support structure is arranged inside the bearing pedestal.

9. The pressure medium container as claimed in claim 5, wherein the support structure is configured as a tubular profile which extends from the base of the closing cap in the direction of the sealing element and has at least one air passage between an inside and an outside of the tubular profile.

10. The pressure medium container as claimed in claim 5, wherein the support structure is configured as at least one cube which extends from the base of the closing cap in the direction of the sealing element and is arranged at the side of a slot in the sealing element.

11. The pressure medium container as claimed in claim 5, wherein the support structure is configured as at least one pin-like or conical protrusion which extends from the base of the closing cap in the direction of the sealing element and is arranged at the side of a slot in the sealing element.

12. The pressure medium container as claimed in claim 1, wherein the pressure equalization takes place via a radially running air channel formed in the base of the closing cap and via a recess of a thread connected thereto.

13. The pressure medium container as claimed in claim 1, wherein the difference in valve opening resistance is predefined by a defined support distance (S) of the support structure.

14. The pressure medium container as claimed in claim 5, wherein the support structure is configured such that in the unactuated starting state of the valve, a defined distance is provided between the sealing element and the support structure.

15. The pressure medium container as claimed in claim 3, wherein a defined pressure difference, which is necessary to move the valve into an opened actuating state, is predefined by a ratio of a length (L) of the slot to a thickness (D) of the sealing element in the region of the slot, wherein the ratio has a value range of approximately between 4/1 and 6/1.

16. The pressure medium container as claimed in claim 2, wherein the difference in valve opening resistance is predefined by a defined support distance (S) of the support structure.

17. The pressure medium container as claimed in claim 3, wherein the difference in valve opening resistance is predefined by a defined support distance (S) of the support structure.

18. The pressure medium container as claimed in claim 4, wherein the difference in valve opening resistance is predefined by a defined support distance (S) of the support structure.

19. The pressure medium container as claimed in claim 5, wherein the difference in valve opening resistance is predefined by a defined support distance (S) of the support structure.

* * * * *